US009943882B2

(12) United States Patent
Zhang et al.

(10) Patent No.: US 9,943,882 B2
(45) Date of Patent: Apr. 17, 2018

(54) MECHANISM AND METHOD FOR SORTING COMPONENTS, COMPONENT FEEDING SYSTEM

(71) Applicants: Tyco Electronics (Shanghai) Co. Ltd., Shanghai (CN); Shenzhen AMI Technology Co. Ltd., Guangdong (CN); Tyco Electronics Corporation, Berwyn, PA (US)

(72) Inventors: Dandan Zhang, Shanghai (CN); Roberto Francisco-Yi Lu, Bellevue, WA (US); Qinglong Zeng, Guangdong (CN)

(73) Assignees: TE Connectivity Corporation, Berwyn, PA (US); Tyco Electronics (Shanghai) co. Ltd., Shanghai (CN); Shenzhen AMI Technology Co. Ltd., Guangdong (CN)

( * ) Notice: Subject to any disclaimer, the term of this patent is extended or adjusted under 35 U.S.C. 154(b) by 105 days.

(21) Appl. No.: 14/950,475

(22) Filed: Nov. 24, 2015

(65) Prior Publication Data

US 2016/0074909 A1 Mar. 17, 2016

Related U.S. Application Data

(63) Continuation of application No. PCT/CN2014/078946, filed on May 30, 2014.

(30) Foreign Application Priority Data

May 31, 2013 (CN) .......................... 2013 1 0211792

(51) Int. Cl.
*B07B 1/28* (2006.01)
*B07B 13/00* (2006.01)
(Continued)

(52) U.S. Cl.
CPC .............. *B07B 1/28* (2013.01); *B07B 13/003* (2013.01); *B07B 13/04* (2013.01); *B07B 13/10* (2013.01); *B25J 11/00* (2013.01)

(58) Field of Classification Search
CPC ......... B07B 1/28; B07B 13/003; B07B 13/02; B07B 13/04; B07B 13/16; B07B 1/282; B07B 1/36; B07B 1/38
(Continued)

(56) References Cited

U.S. PATENT DOCUMENTS 208,257 A * 9/1878 Morgan .................. B07B 13/02 209/684
1,676,519 A * 7/1928 Carter ..................... B07B 13/02 209/684
(Continued)

FOREIGN PATENT DOCUMENTS

CN 1704178 A 12/2005
CN 2889519 Y 4/2007
(Continued)

OTHER PUBLICATIONS

PCT International Search Report, International App. No. PCT/CN2014/078936, dated Sep. 3, 2014, 8 pages.
(Continued)

*Primary Examiner* — Joseph C Rodriguez
(74) *Attorney, Agent, or Firm* — Barley Snyder

(57) ABSTRACT

A component sorting mechanism is disclosed. The component sorting mechanism includes a vibrating plate, a feeding tray having a plurality of grooves in an inner bottom surface thereof, the feeding tray mounted on the vibrating plate, and a first driving device connected to the feeding tray. The first driving device drives the feeding tray to swing within a predetermined angle range.

28 Claims, 9 Drawing Sheets

121
120
122
X
126
128
124
125
111
127
110

(51) Int. Cl.
*B07B 13/04* (2006.01)
*B07B 13/10* (2006.01)
*B25J 11/00* (2006.01)

(58) Field of Classification Search
USPC .......................................... 209/682, 684, 701
See application file for complete search history.

(56) References Cited

U.S. PATENT DOCUMENTS 3,388,798 A * 6/1968 Westbrook ................ B07B 1/36 198/770
3,667,103 A * 6/1972 Petree .................. H05K 13/028 29/737
3,675,770 A * 7/1972 Ettlinger, Jr. ......... B07B 13/003 209/682
3,704,504 A * 12/1972 Koegler ............... H05K 13/028 29/743
4,406,373 A * 9/1983 Braden ................... B07C 5/344 209/574
4,693,057 A * 9/1987 Rittinger ................. B65B 9/045 53/247
4,693,379 A * 9/1987 Stehle ....................... B07B 1/12 209/314
4,848,607 A * 7/1989 Halley ...................... B07B 1/46 209/319
5,052,167 A * 10/1991 Scharch .................. B65B 19/34 198/761
5,337,893 A * 8/1994 Nami ................. H05K 13/0084 118/503
5,802,965 A * 9/1998 Lin ........................... B07B 1/28 209/629
6,398,036 B1 * 6/2002 Griebat ................... B07B 13/02 209/467
6,782,992 B2 8/2004 Mimura et al.
7,997,416 B2 8/2011 Vecchiato
8,118,174 B2 * 2/2012 Gnann .................... B65B 5/103 209/606
8,863,959 B1 * 10/2014 Britton ...................... B07B 1/28 209/11
9,669,428 B2 * 6/2017 Pau ....................... B07B 13/003
2009/0071882 A1 * 3/2009 Murayama .............. B07B 13/04 209/684

FOREIGN PATENT DOCUMENTS

CN 201510990 U 6/2010
CN 202240416 U 5/2012
JP 6317723 A 1/1988

OTHER PUBLICATIONS

Abstract of CN1704178(A), dated Dec. 7, 2005, 1 page.
Abstract of CN202240416(U), dated May 30, 2012, 1 page.
Abstract of CN201510990(U), dated Jun. 23, 2010, 1 page.
Abstract of JPS6317723(A), dated Jan. 25, 1988, 2 pages.
Abstract of CN2889519(Y), dated Apr. 18, 2007, 1 page.

* cited by examiner

MECHANISM AND METHOD FOR SORTING COMPONENTS, COMPONENT FEEDING SYSTEM

CROSS-REFERENCE TO RELATED APPLICATIONS

This application is a continuation of PCT International Application No. PCT/CN2014/078946, filed May 30, 2014, which claims priority under 35 U.S.C. § 119 to Chinese Application No. 201310211792.2, filed May 31, 2013.

FIELD OF THE INVENTION

The present invention relates to a mechanism for automatically sorting components, and more particularly, to a mechanism for automatically sorting small components with complex structures.

BACKGROUND

In the prior art, small components with complex structures, for example, various electronic components, are generally sorted by a vibrating plate. A plurality of grooves, matched with respective components to be sorted in size and shape, are arranged in an array in an inner bottom surface of the vibrating plate. The components to be sorted are placed into the vibrating plate. When the vibrating plate vibrates back and forth, these small components are automatically sorted into the respective grooves. In this way, these small components with complex structures are initially sorted. Thereafter, a vision robot may pick up the components, which have been sorted into the respective grooves, from the vibrating plate and mount the picked components onto a circuit board.

However, in the prior art, the vibrating plate vibrates back and forth only in a horizontal direction. As a result, it is difficult to turn or change the postures of these components in the vibrating plate. Some components may be easily jammed in the grooves in incorrect postures. Once jammed, the whole component feeding system must be stopped, which seriously undermines production efficiency.

SUMMARY

An object of the invention, among others, is to provide a component sorting mechanism capable of efficiently sorting small complex components into respective grooves in correct postures. The disclosed component sorting mechanism includes a vibrating plate, a feeding tray having a plurality of grooves in an inner bottom surface thereof, the feeding tray mounted on the vibrating plate, and a first driving device connected to the feeding tray. The first driving device drives the feeding tray to swing within a predetermined angle range.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a component sorting mechanism. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
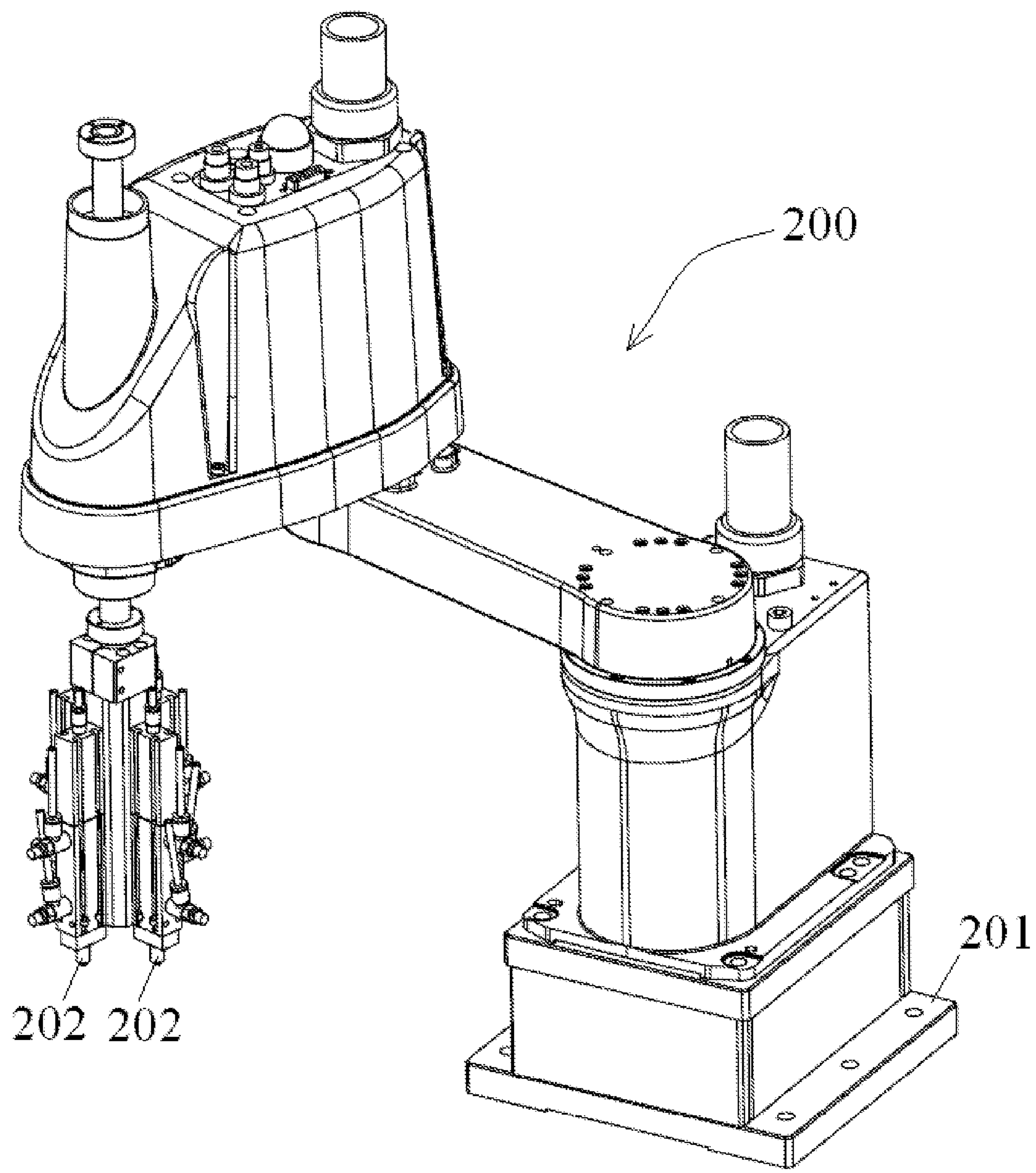
FIG. 1 is a perspective view of a vision robot according to an embodiment of the invention.
Figure 2:
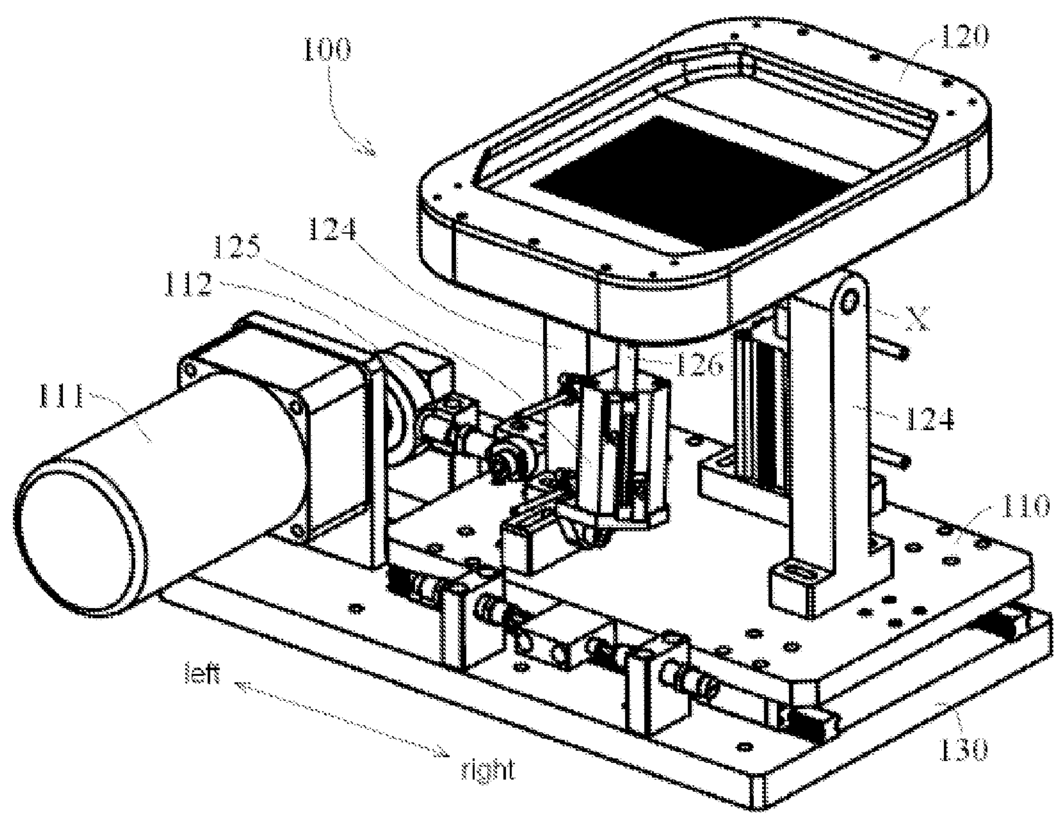
FIG. 2 is a perspective view of a component sorting mechanism according to an embodiment of the invention.

As shown in FIGS. 1 and 2, the component feeding system of the present invention includes a component sorting mechanism 100 and a vision robot 200. The major components of the invention will now be described in greater detail.

The component sorting mechanism 100, as shown in FIG. 2, includes a vibrating plate 110, a feeding tray 120, a first driving device, supporting posts 124, a supporting device, and a second driving device.

The vibrating plate 110 substantially exhibits a flat plate member. The vibrating plate 110 is slidably mounted on a base plate 130 by, for example, a sliding slot or a sliding rail. The base plate 130 may be fixed on a frame or the ground.

Figure 3:
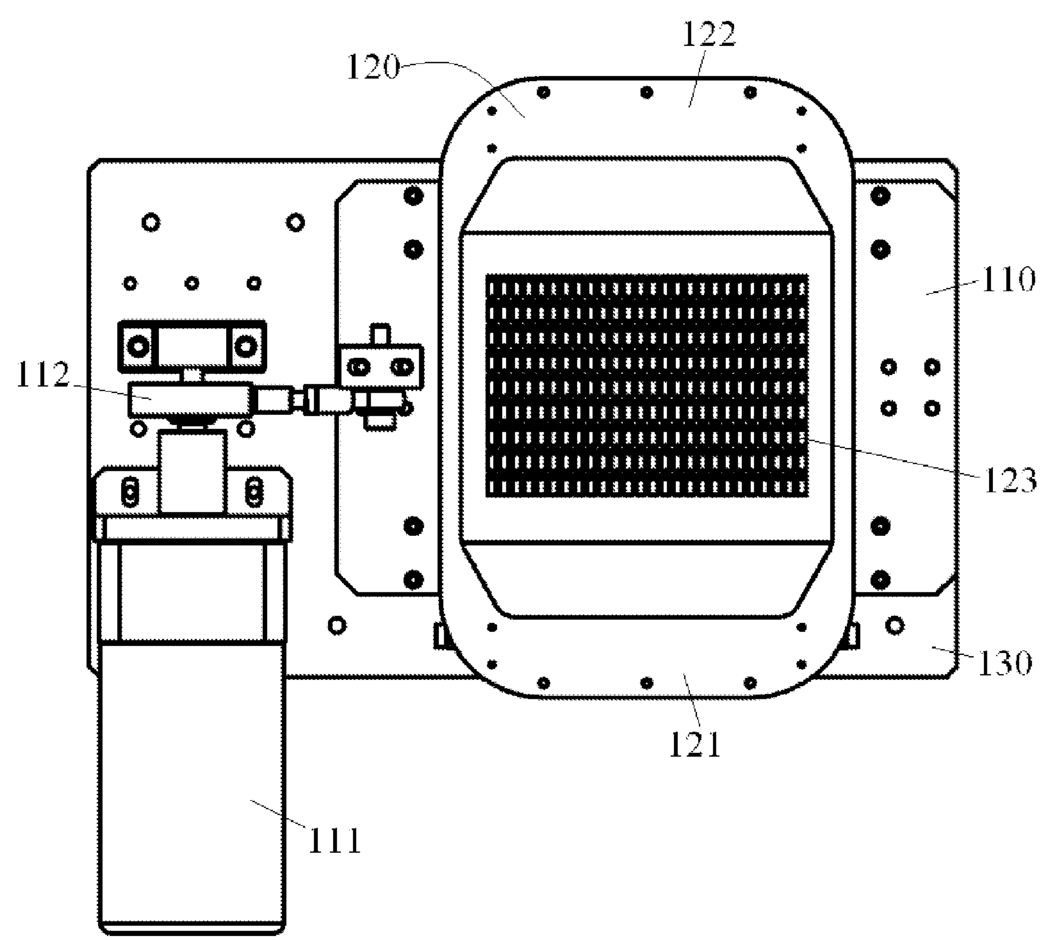
FIG. 3 is a top view of the component sorting mechanism of FIG. 2.

The feeding tray 120 is formed as a rectangular plate with a concave receiving cavity therein. A plurality of grooves 123 are formed in an inner bottom surface of the feeding tray 120. The plurality of grooves 123 may be arranged in an array. The grooves 123 are formed to be matched with respective components to be sorted in size and shape. According to actual requirements, the sizes and/or the shapes of these grooves 123 may be same or different. As shown in FIGS. 2 and 3, the feeding tray 120 has a first side 121 and a second side 122 opposite to the first side 121 in the length direction.

A first driving device is mounted on the vibrating plate 110. As shown in FIGS. 2 and 3, the first driving device may comprise a linear motion actuator, for example, a first (air or hydraulic) cylinder 125. The first cylinder 125 comprises a body and a rod 126 in the body, the body of the first cylinder 125 is rotatably connected to the vibrating plate 110, a tip end of the rod 126 of the first cylinder 125 is rotatably connected to the feeding tray 120 at a first position (see FIG. 4) distanced from the pivotal axis X by a first predetermined distance. The first driving device may also be the rotary actuator, for example, a motor. An output shaft of the motor may be directly or indirectly connected to a pivotal shaft of the feeding tray 120, so as to drive the feeding tray 120 to swing back and forth about the pivotal axis X.

A pair of supporting posts 124, shown in FIG. 2, are fixedly mounted on the vibrating plate 110. The feeding tray 120 is pivotally supported on the pair of supporting posts 124, so as to swing back and forth about a pivotal axis X. As shown in FIGS. 2 and 3, the feeding tray 120 has a width direction parallel to a pivotal axis X and a length direction perpendicular to the width direction.

Figure 4:
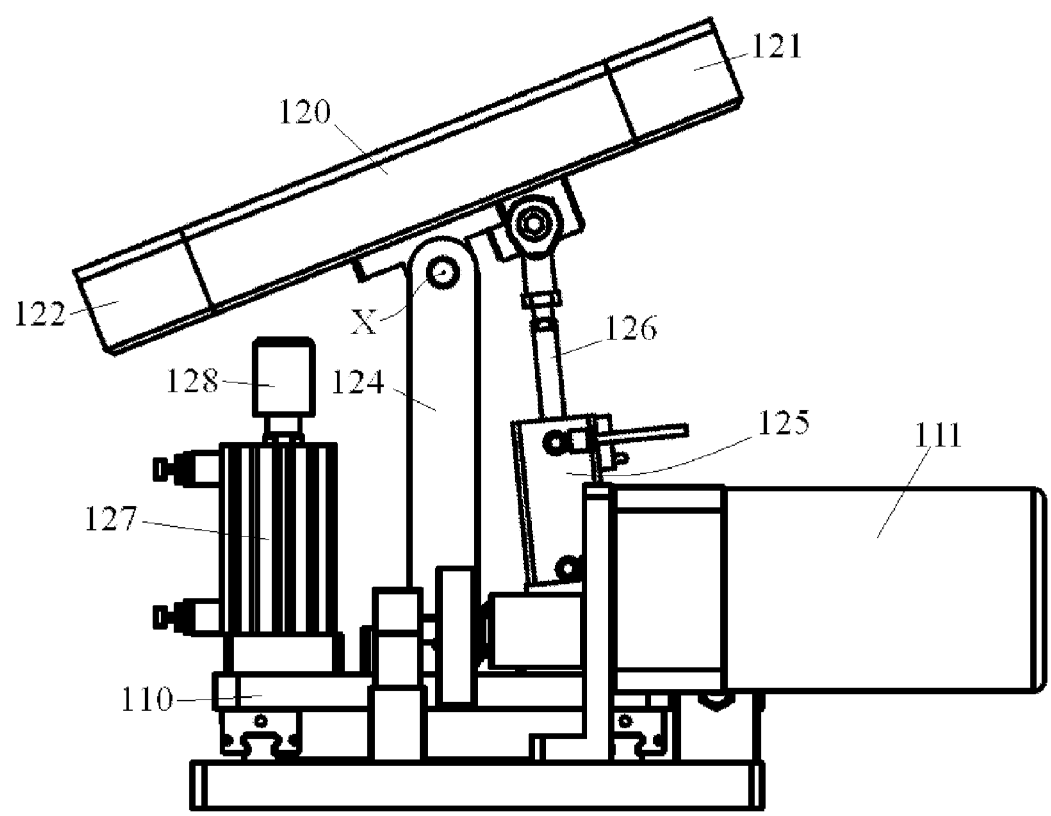
FIG. 4 is a side view of the component sorting mechanism in a first position.

As shown in FIG. 4, a supporting device, opposite to the first cylinder 125, is mounted on the vibrating plate 110 at the second side 122 of the feeding tray 120. The supporting device may comprise a second (air/hydraulic) cylinder 127. The second cylinder 127 comprises a body and a rod 128 in the body, the body of the second cylinder 127 is fixed on the vibrating plate 110, the rod 128 of the second cylinder 127 is not connected to the feeding tray 120 and perpendicular to the vibrating plate 110.

As shown in FIG. 2, a second driving device, configured to drive the vibrating plate 110 to vibrate back and forth in the horizontal direction, is mounted on the base plate 130. In an embodiment of the present invention, the second driving device may comprise a linear motion actuator or a rotary actuator. In the illustrated embodiment, the second driving device is a motor 111, and a cam transmission mechanism 112 is provided between the motor 111 and the vibrating plate 110, so as to convert a rotation motion of the motor 111 into the a linear reciprocating motion of the vibrating plate 110.

The vision robot 200, as shown in FIG. 1, includes a seat 201, a multi-freedom arm mechanism mounted on the seat 201, and a picking device 202 mounted on an end arm of the multi-freedom arm mechanism. In an embodiment, the seat 201 of the vision robot 200 and the base plate 130 of the component sorting mechanism may be both fixed on the frame (not shown) or the ground. The arm mechanism of the vision robot 200 may have six different freedoms. The picking device 202 may comprise a vacuum sucker with, for example, one or more vacuum suction nozzles. The vacuum suction nozzles may be arranged on a rotating turntable (not shown).

The operation of the component feeding system will now be described.

Figure 5:
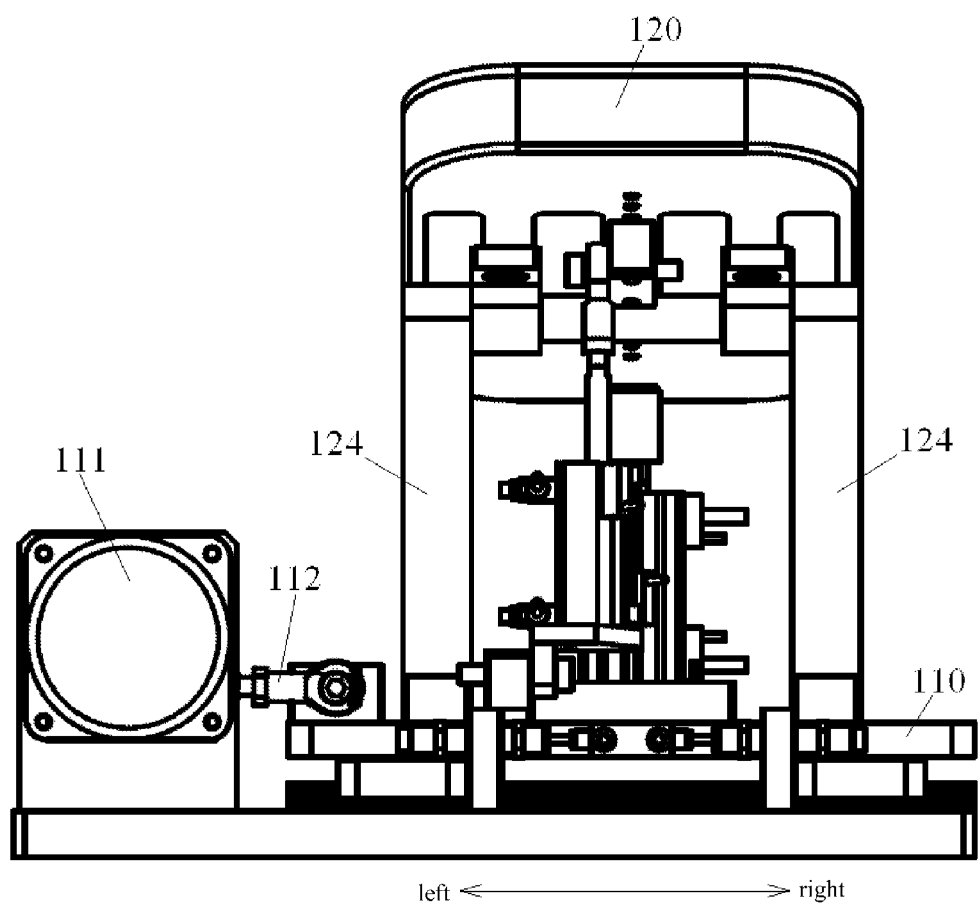
FIG. 5 is a front view of the component sorting mechanism of FIG. 4.

As shown in FIGS. 4 and 5, while components to be sorted are fed into the feeding tray 120, the first cylinder 125 drives the feeding tray 120 to a first tilt posture having a first tilt angle with respect to the horizontal plane, and the components to be sorted are fed into the feeding tray 120 from a feeding end at a higher side 121 of the first and second sides 121 and 122 of the feeding tray 120. The first tilt angle may be determined based on the sizes and the shapes of the components to be sorted. In an embodiment, the first tilt angle may be of 20 to 30 degrees.

After the components to be sorted are fed into the feeding tray 120, the vibrating plate 110 drives the feeding tray 120 to vibrate back and forth in the horizontal direction (a left-right direction in FIG. 2). Meanwhile, the first cylinder 125 drives the feeding tray 120 to swing back and forth about the pivotal axis X within a predetermined angle range. In an embodiment, the predetermined angle range may be determined on the sizes and the shapes of the components to be sorted. For instance, the feeding tray 120 may swing back and forth about the pivotal axis X within in an angle of +25 degrees to −25 degrees with respect to a horizontal plane. The rod 126 of the first cylinder 125 may drive the feeding tray 120 to swing back and forth about the pivotal axis X when the rod 126 of the first cylinder 125 reciprocates.

As a result, the components may automatically roll up and down in the feeding tray 120 under the action of gravity, and the postures of these components are continuously changed. In this way, these components may be easily sorted into the respective grooves in correct postures and may not be jammed in the grooves, increasing the efficiency of sorting the components.

In an embodiment of the present invention, the vibration frequency and the vibration magnitude of the vibrating plate 110 may be determined based on the sizes and the shapes of the components to be sorted. In an embodiment, the vibrating plate 110 may have a vibration frequency of 3 times/second and a vibration magnitude of 5 mm. As shown in FIG. 4, the rod 128 of the second cylinder 127 is retracted during sorting the components, so as to allow the feeding tray 120 to swing back and forth.

Figure 8:
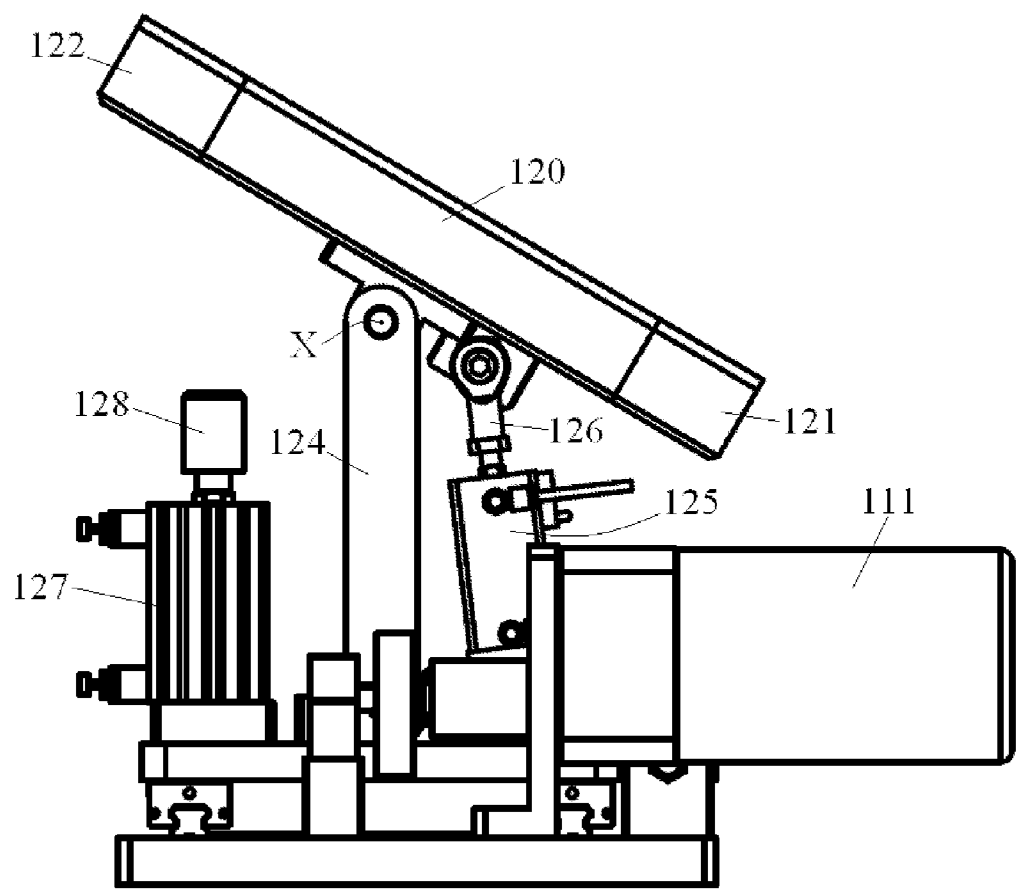
FIG. 8 is a side view of the component sorting mechanism in a third position.
Figure 9:
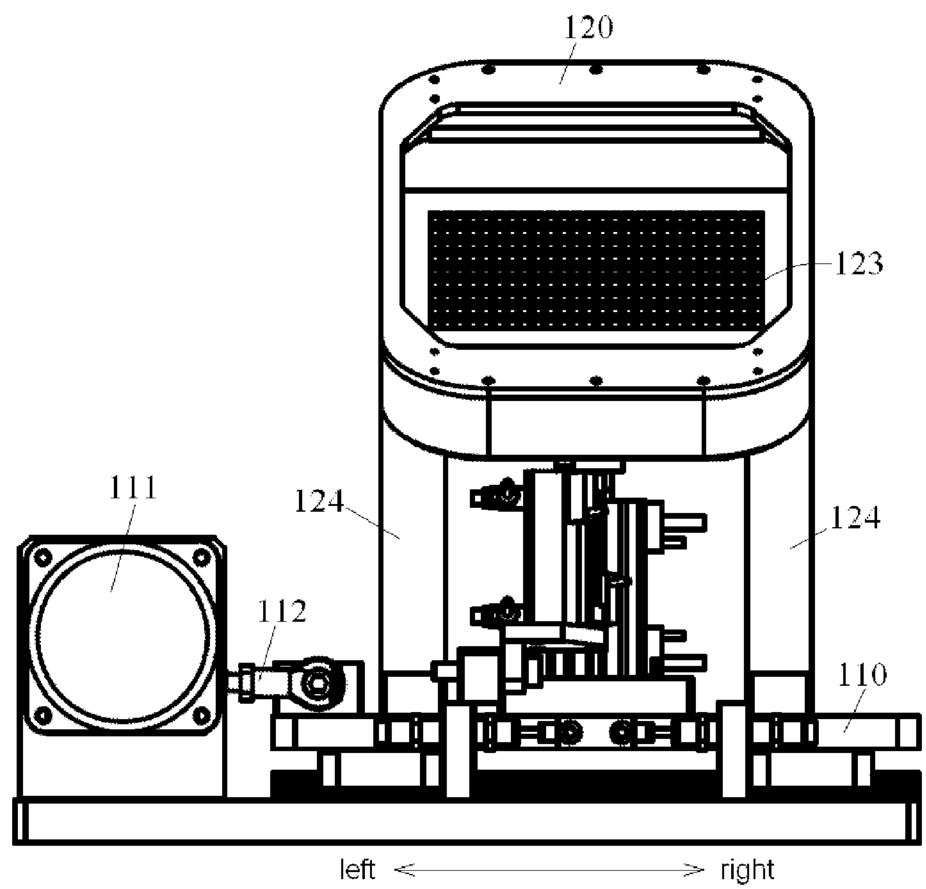
FIG. 9 is a front view of the component sorting mechanism of FIG. 8.

Once the components have been sorted in the feeding tray 120, excess components which are not sorted into the respective grooves 123 are dumped back to the feeding end (the end at the first side 121) of the feeding tray 120. At this time, as shown in FIGS. 8 and 9, the first cylinder 125 drives the feeding tray 120 to a second tilt posture having a second tilt angle, larger than the first tilt angle, with respect to the horizontal plane. In this condition, the feeding end is located at a lower side 121 of the first and second sides 121, 122 of the feeding tray 120, so as to dump the excess components back to the feeding end. The second tilt angle may be determined based on the sizes and the shapes of the components to be sorted. In an embodiment, the second tilt angle may be within 30 to 35 degrees.

As shown in FIG. 9, during dumping excess components out of the feeding tray 120, the feeding tray 120 may vibrate back and forth together with the vibrating plate 110 in the horizontal direction (the left-right direction of FIG. 2). In this way, it may further improve the dumping efficiency of the components.

Figure 6:
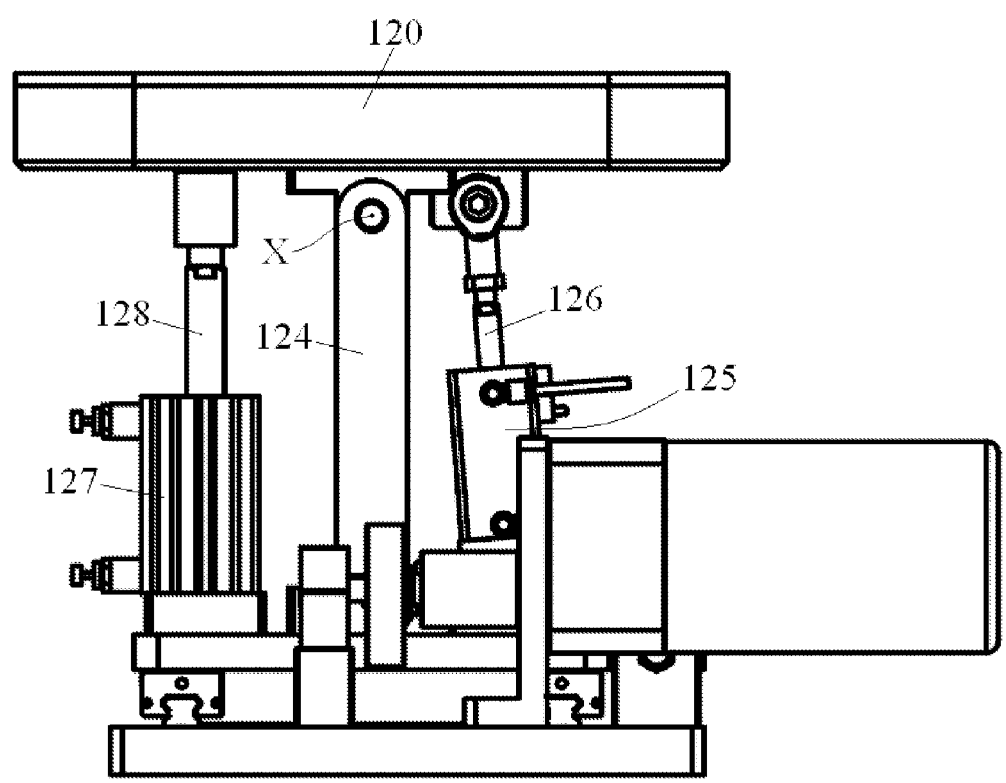
FIG. 6 is a side view of the component sorting mechanism in a second position.
Figure 7:
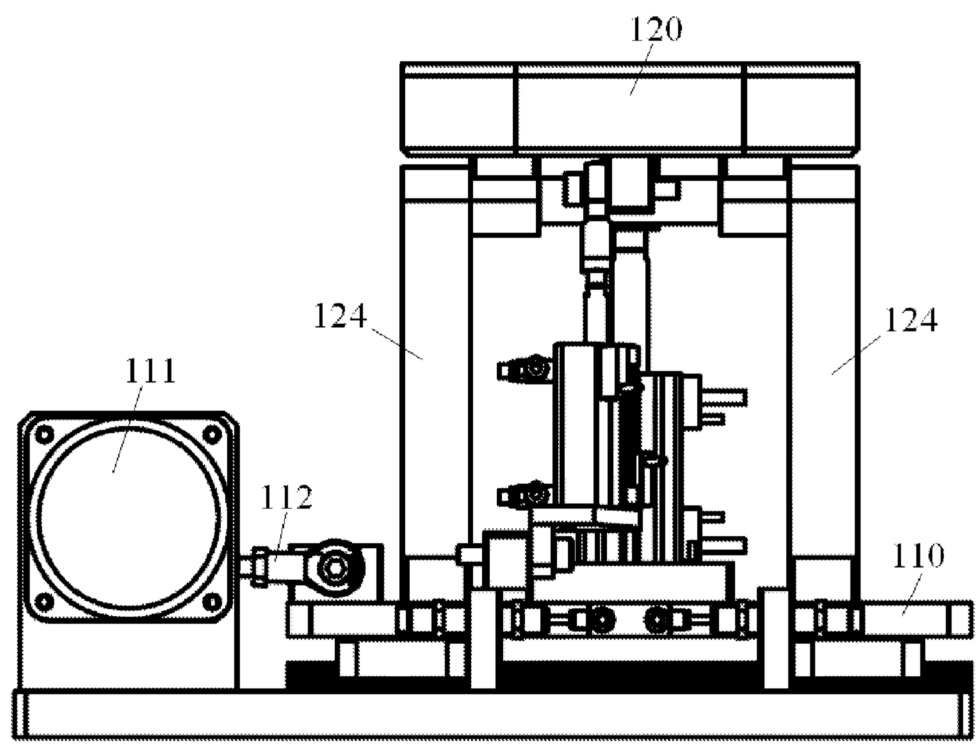
FIG. 7 is a front view of the component sorting mechanism of FIG. 6.

After the components are sorted and waiting to be picked up by the picking device 202, the vibrating plate 110 is stopped, and the rod 128 of the second cylinder 127 is extended, so as to support the feeding tray 120 in the horizontal posture shown in FIG. 6 by cooperating with the first cylinder 125.

The vision robot 200 is configured to pick up the sorted components. The support of the rod 128 prevents any unnecessary small swing of the feeding tray 120 while the picking device 202 picks up the components from the feeding tray 120, and may improve the positioning accuracy of the picking device 202 during picking up the components and mounting the picked components on a circuit board.

In another embodiment of the present invention, there is disclosed a method for sorting components, comprising steps of:

S100: providing a component sorting mechanism, wherein the component sorting mechanism comprises a vibrating plate 110 and a feeding tray 120 mounted on the vibrating plate 110, a plurality of grooves 123, matched with respective components to be sorted in size and shape, being formed in an inner bottom surface of the feeding tray 120; and

S200: driving the feeding tray 120 to vibrate together with the vibrating plate 110 back and forth in the horizontal direction and swing back and forth about a pivotal axis X parallel to the horizontal direction within a predetermined angle range, so as to sort the components into respective grooves 123.

In an embodiment, the above method may further comprise steps of:

S300: stopping the vibrating plate 110 after the components are sorted into the respective grooves 123; and

S400: picking up the components, which have been sorted into the respective grooves 123, from the feeding tray 120 of the component sorting mechanism 100 by a vision robot 200.

Advantageously, in the above described invention, small, complex components may be easily overturned and continuously change their postures. The components may thus be easily sorted into the respective grooves in correct postures and are not jammed in the grooves, increasing the efficiency of sorting the components. In the above embodiments of the present invention, the component sorting mechanism has good generality. For example, when the types of the components to be sorted are changed, only the feeding plate needs to be changed instead of the entire component sorting mechanism. Thereby, it reduces cost and saves time. The vision robot may directly pick up the components in the respective grooves based on a preset program, and does not need to visually identify the sizes and the shapes of the components. As a result, it significantly reduces the computational complexity and the computing time of the vision system of the vision robot and increases the reliability and efficiency of the vision system.

What is claimed is:

1. A component sorting mechanism, comprising:

a vibrating plate slidably mounted on a base plate;

a feeding tray having a plurality of grooves in an inner bottom surface thereof, the feeding tray mounted on the vibrating plate;

a first driving device connected to the feeding tray, the first driving device driving the feeding tray to swing within a predetermined angle range; and a second driving device connected to the vibrating plate and mounted on the base plate, the second driving device vibrating the vibrating plate.

2. The component sorting mechanism of claim 1, wherein the vibrating plate vibrates back and forth in a horizontal direction and the feeding tray vibrates with the vibrating plate.

3. The component sorting mechanism of claim 2, wherein the feeding tray swings about a pivotal axis parallel to the horizontal direction.

4. The component sorting mechanism of claim 3, wherein the first driving device is mounted on the vibrating plate.

5. The component sorting mechanism of claim 4, wherein the first driving device is a linear motion actuator or a rotary actuator.

6. The component sorting mechanism of claim 5, wherein the first driving device has a first cylinder including a first body and a first rod in the first body, the first body rotatably connected to the vibrating plate and the rod rotatably connected to the feeding tray.

7. The component sorting mechanism of claim 6, wherein a tip end of the first rod is connected to a bottom of the feeding tray at a first distance from the pivotal axis.

8. The component sorting mechanism of claim 7, further comprising a pair of supporting posts mounted on the vibrating plate and pivotally supporting the feeding tray.

9. The component sorting mechanism of claim 8, further comprising a supporting device having a second cylinder including a second body mounted on the vibrating plate and a second rod in the second body.

10. The component sorting mechanism of claim 9, wherein the second rod is in a retracted position when the feeding tray swings within the predetermined angle range.

11. The component sorting mechanism of claim 10, wherein the second rod is in an extended position supporting the feeding tray in a horizontal posture when the feeding tray does not swing within the predetermined angle range.

12. The component sorting mechanism of claim 1, wherein the second driving device has a motor and a cam transmission mechanism provided between the motor and the vibrating plate.

13. A method for sorting components, comprising the steps of:

providing a component sorting mechanism having a vibrating plate and a feeding tray including a plurality of grooves in an inner bottom surface thereof, the feeding tray mounted on the vibrating plate;

feeding components into the feeding tray; and sorting the components into respective grooves by driving the feeding tray to vibrate with the vibrating plate in a horizontal direction and rotate about a pivotal axis parallel to the horizontal direction.

14. The method for sorting components of claim 13, further comprising the step of stopping the vibrating plate after the components are sorted into the respective grooves.

15. The method for sorting components of claim 14, further comprising the step of picking up the sorted components from the feeding tray using a vision robot.

16. The method for sorting components of claim 15, wherein the feeding step includes driving the feeding tray to a first tilt posture having a first tilt angle with respect to the horizontal plane, and feeding the components from a feeding end at a higher side of the feeding tray.

17. The method for sorting components of claim 16, further comprising the step of dumping excess components out of the feeding tray.

18. The method for sorting components of claim 17, wherein the dumping step includes driving the feeding tray to a second tilt posture having a second tilt angle larger than the first tilt angle, the feeding end at a lower side of the feeding tray.

19. The method for sorting components of claim 18, wherein during both the feeding and dumping steps, the feeding tray vibrates with the vibrating plate in the horizontal direction.

20. A component sorting mechanism, comprising:

a vibrating plate vibrating back and forth in a horizontal direction;

a feeding tray having a plurality of grooves in an inner bottom surface thereof, the feeding tray mounted on the vibrating plate and vibrating with the vibrating plate; and a first driving device connected to the feeding tray, the first driving device driving the feeding tray to rotate within a predetermined angle range about a pivotal axis parallel to the horizontal direction.

21. The component sorting mechanism of claim 20, wherein the first driving device is mounted on the vibrating plate.

22. The component sorting mechanism of claim 21, wherein the first driving device is a linear motion actuator or a rotary actuator.

23. The component sorting mechanism of claim 22, wherein the first driving device has a first cylinder including a first body and a first rod in the first body, the first body rotatably connected to the vibrating plate and the rod rotatably connected to the feeding tray.

24. The component sorting mechanism of claim 23, wherein a tip end of the first rod is connected to a bottom of the feeding tray at a first distance from the pivotal axis.

25. The component sorting mechanism of claim 24, further comprising a pair of supporting posts mounted on the vibrating plate and pivotally supporting the feeding tray.

26. The component sorting mechanism of claim 25, further comprising a supporting device having a second cylinder including a second body mounted on the vibrating plate and a second rod in the second body.

27. The component sorting mechanism of claim 26, wherein the second rod is in a retracted position when the feeding tray swings within the predetermined angle range.

28. The component sorting mechanism of claim 27, wherein the second rod is in an extended position supporting the feeding tray in a horizontal posture when the feeding tray does not swing within the predetermined angle range.

* * * * *